(12) United States Patent
Cheng et al.

(10) Patent No.: US 12,363,513 B2
(45) Date of Patent: Jul. 15, 2025

(54) SYSTEM AND METHOD OF MONITORING A DRAINAGE NETWORK

(71) Applicant: Logistics and Supply Chain MultiTech R&D Centre Limited, Hong Kong (HK)

(72) Inventors: Chun Hung Cheng, Hong Kong (HK); Ho Lam, Hong Kong (HK); Shiu Kee Luk, Hong Kong (HK); Kwong Tim Chan, Hong Kong (HK); Hoi Shun Tam, Hong Kong (HK)

(73) Assignee: Logistics and Supply Chain MultiTech R&D Centre Limited, Hong Kong (HK)

( * ) Notice: Subject to any disclaimer, the term of this patent is extended or adjusted under 35 U.S.C. 154(b) by 203 days.

(21) Appl. No.: 18/121,654

(22) Filed: Mar. 15, 2023

(65) Prior Publication Data

US 2024/0314526 A1 Sep. 19, 2024

(51) Int. Cl.
*H04W 4/38* (2018.01)
*H04L 67/12* (2022.01)
*H04W 84/18* (2009.01)

(52) U.S. Cl.
CPC ............ *H04W 4/38* (2018.02); *H04L 67/12* (2013.01); *H04W 84/18* (2013.01)

(58) Field of Classification Search
CPC .......... H04W 4/38; H04W 84/18; H04L 67/12
See application file for complete search history.

(56) References Cited

U.S. PATENT DOCUMENTS

| 5,389,821 | A | * | 2/1995 | Moulliet | F03B 13/06 290/43 |
|---|---|---|---|---|---|
| 2021/0357657 | A1 | * | 11/2021 | Hu | G06F 18/214 |
| 2023/0044362 | A1 | * | 2/2023 | Ulen | H04L 9/0894 |

FOREIGN PATENT DOCUMENTS

CN 218481123 U * 2/2023

* cited by examiner

*Primary Examiner* — Basil Ma
(74) *Attorney, Agent, or Firm* — GableGotwals

(57) ABSTRACT

The invention provides a drainage network monitoring system. The system comprises a sensing module for detecting one or more conditions at a location in the drainage network; a processing module for processing data received from the sensing module; a wireless communications module for communicating the processed data substantially in real-time to one or more wireless devices including a wireless notification device configured to issue notification information to users, wherein the wireless communications module utilizes a narrow bandwidth, low power wireless communications protocol to communicate processed data to the wireless notification device, and wherein the sensing module has a standalone power supply.

12 Claims, 4 Drawing Sheets

SYSTEM AND METHOD OF MONITORING A DRAINAGE NETWORK

FIELD OF THE INVENTION

The invention relates to a system and a method for drainage network monitoring. More particularly, but not exclusively, the invention relates to a system and a method of monitoring part of a drainage network for wastewater such as rainwater or stormwater.

BACKGROUND OF THE INVENTION

Various drainage networks for passage of wastewater such as rainwater, stormwater, sewage, or foul water have been developed for collecting and discharging the wastewater. Rainwater drainage networks are generally installed to direct and to manage the flow of rainwater away from low-lying geographical areas, especially after heavy rainstorms to prevent flooding in such areas. The wastewater may often carry with it precipitation, debris or solid waste washed from roads, buildings and other land surfaces. The design of a rainwater drainage network may vary depending on factors such as the amount of typical rainfall in a given area, the topography of the land, as well as other infrastructure located in the area.

Common rainwater drainage networks may comprise traps or catchment basins for intercepting and collecting wastewater, and networks of pipes, channels and/or tunnels for directing the wastewater directly to the sea or to water treatment facilities. However, such drainage networks are often built in remote areas which typically makes them not easily accessible for maintenance and for monitoring their operating conditions. It is therefore not uncommon for inlets or outlets of the pipes and channels of such networks to become blocked or obstructed due to an accumulation of branches, leaves, or other solid waste carried by the rainwater. Traditionally, regular manual inspections are required to detect the blockages and/or other operational defects of the drainage network which are labor intensive tasks. It may also present risks with respect to the safety of the inspecting staff to conduct on-site inspections, especially under bad weather conditions. Floodings often result from the poor design and inadequate management of wastewater drainage networks, causing damage to infrastructures such as roads, buildings, and properties, creating safety hazards for people and animals, and disrupting transportation, all of which are very undesirable.

Objects of the Invention

An object of the present invention is to provide a novel monitoring system and method for wastewater drainage.

Another object of the present invention is to mitigate or obviate to some degree one or more problems associated with known wastewater drainage networks, or at least to provide a useful alternative.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a drainage network monitoring system. The system comprises a sensing module for detecting one or more conditions at a location in the drainage network; a processing module for processing data received from the sensing module; a wireless communications module for communicating the processed data substantially in real-time to one or more wireless devices including a wireless notification device configured to issue notification information to users, wherein the wireless communications module utilizes a narrow bandwidth, low power wireless communications protocol to communicate processed data to the wireless notification device, and wherein the sensing module has a standalone power supply.

In a second main aspect, the invention provides a method of monitoring a drainage network, comprising the steps of: detecting, via a sensing module, one or more conditions at a location in the drainage network; processing, via a processing module, data received from the sensing module; communicating, via a wireless communications module, the processed data in substantially real-time to one or more wireless devices including a wireless notification device configured to issue notification information to users; wherein the wireless communications module utilizes a narrow bandwidth, low power wireless communications protocol to communicate processed data to the wireless notification device, and wherein the sensing module has a standalone power supply.

In a third main aspect, the invention provides a drainage network monitoring device comprising a memory for storing data and a processor for executing computer readable instructions. The processor is configured by the computer readable instructions when being executed to implement the method of the second main aspect.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
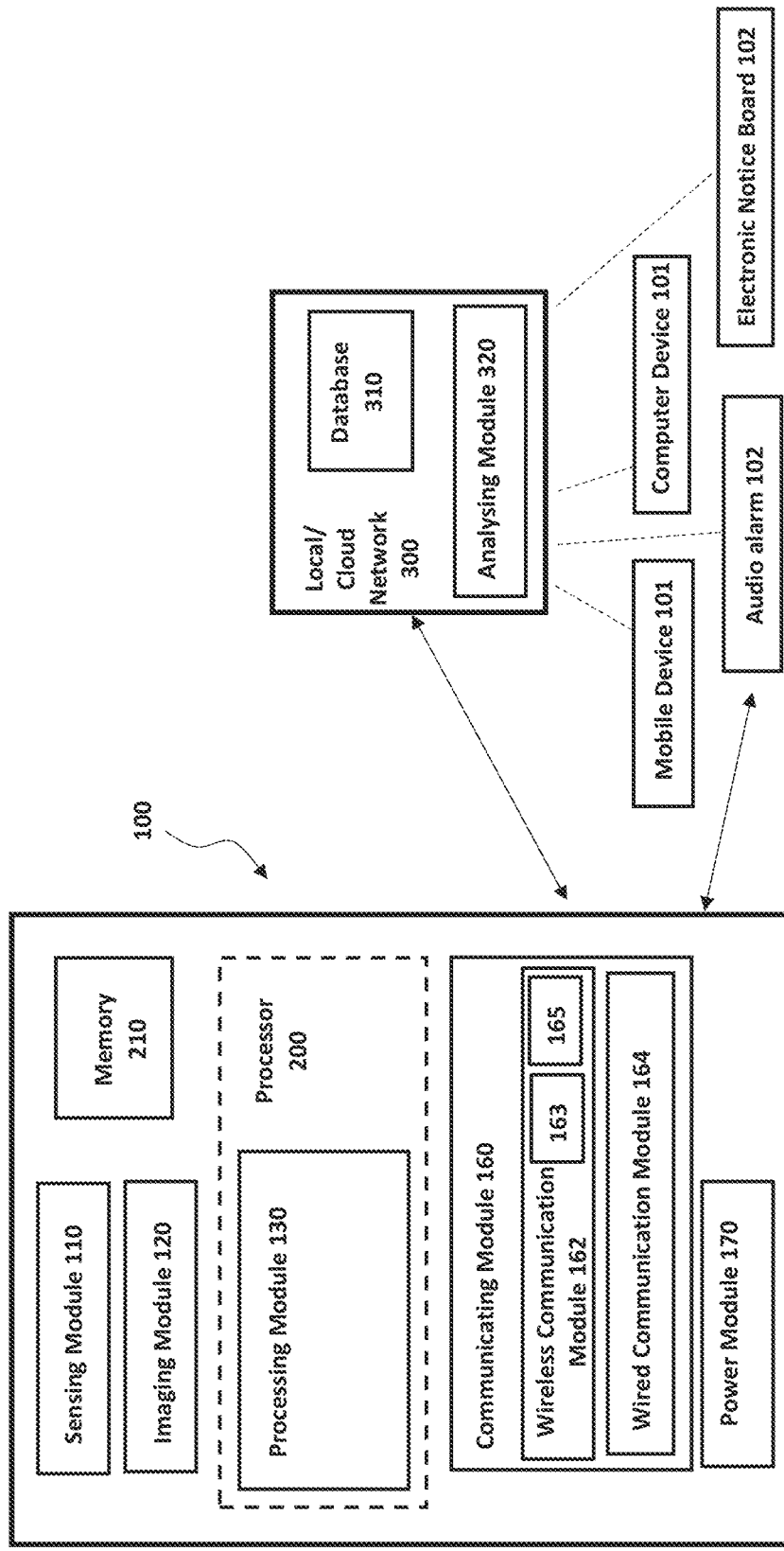
FIG. 1 is a block diagram showing an embodiment of the drainage network monitoring system according to the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the figures, may be implemented in various forms of hardware, software, or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The present invention relates to a system and a method of remote monitoring of drainage or sewage networks such as, but not limited to, drainage networks for rainwater, stormwater, foul water, or other wastewater. Particularly, but not exclusively, the monitoring system of the present invention is adapted to determine, in real-time or near real-time, conditions at least at one location in a rainwater drainage network such as wastewater level, wastewater flow velocity, wastewater turbidity in order to detect, for examples, blockages or potential blockages at one or more points in the drainage network. This is achieved by a specific combination of internet-of-things (IoT) modules and wireless communication modules, which may comprise, but are not limited to, one or more sensing modules such as a water level sensor, a flow velocity sensor, a turbidity sensor, and/or a camera for detecting conditions of the wastewater. The camera may be configured to capture images or videos to reveal real-time or near real-time conditions of the wastewater in the drainage network. Computer software such as computer visual and/or artificial intelligent (AI) algorithms may further be applied to process the obtained data from the sensing modules and/or the camera, which significantly enhances accuracy and efficiency of the detection and the monitoring processes. The present invention further provides a computer-implemented platform, which can be web-based and/or APP-based, for remote monitoring of conditions of the drainage network. Alerts can be generated and delivered in real-time or near real-time to warn of problems and to avoid or mitigate blockage of the drainage network, reducing or negating the need for manual, on-site inspections, particularly under bad weather conditions. The system is automatic, efficient, and reliable, and self-powered.

Figure 2:
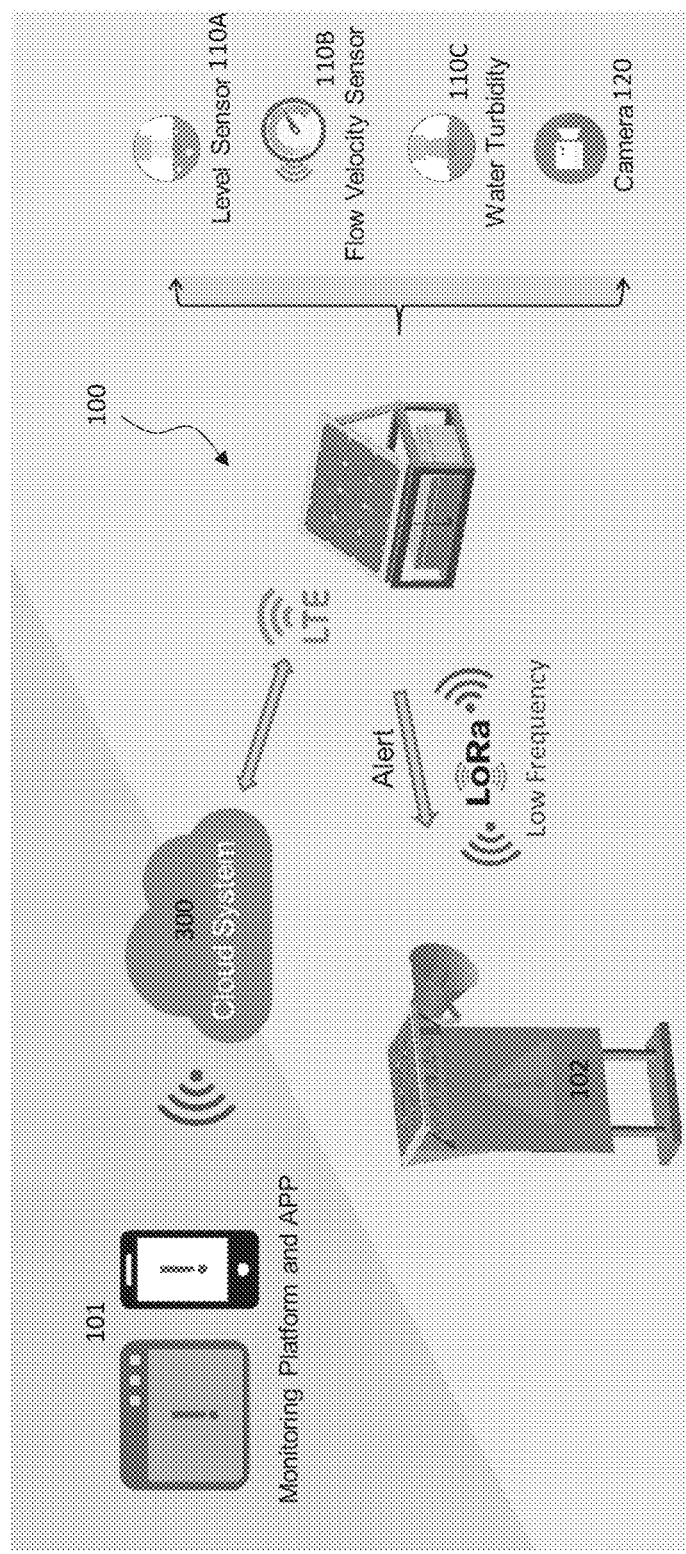
FIG. 2 is a schematic diagram showing the embodied drainage network monitoring system of FIG. 1.
Figure 3:
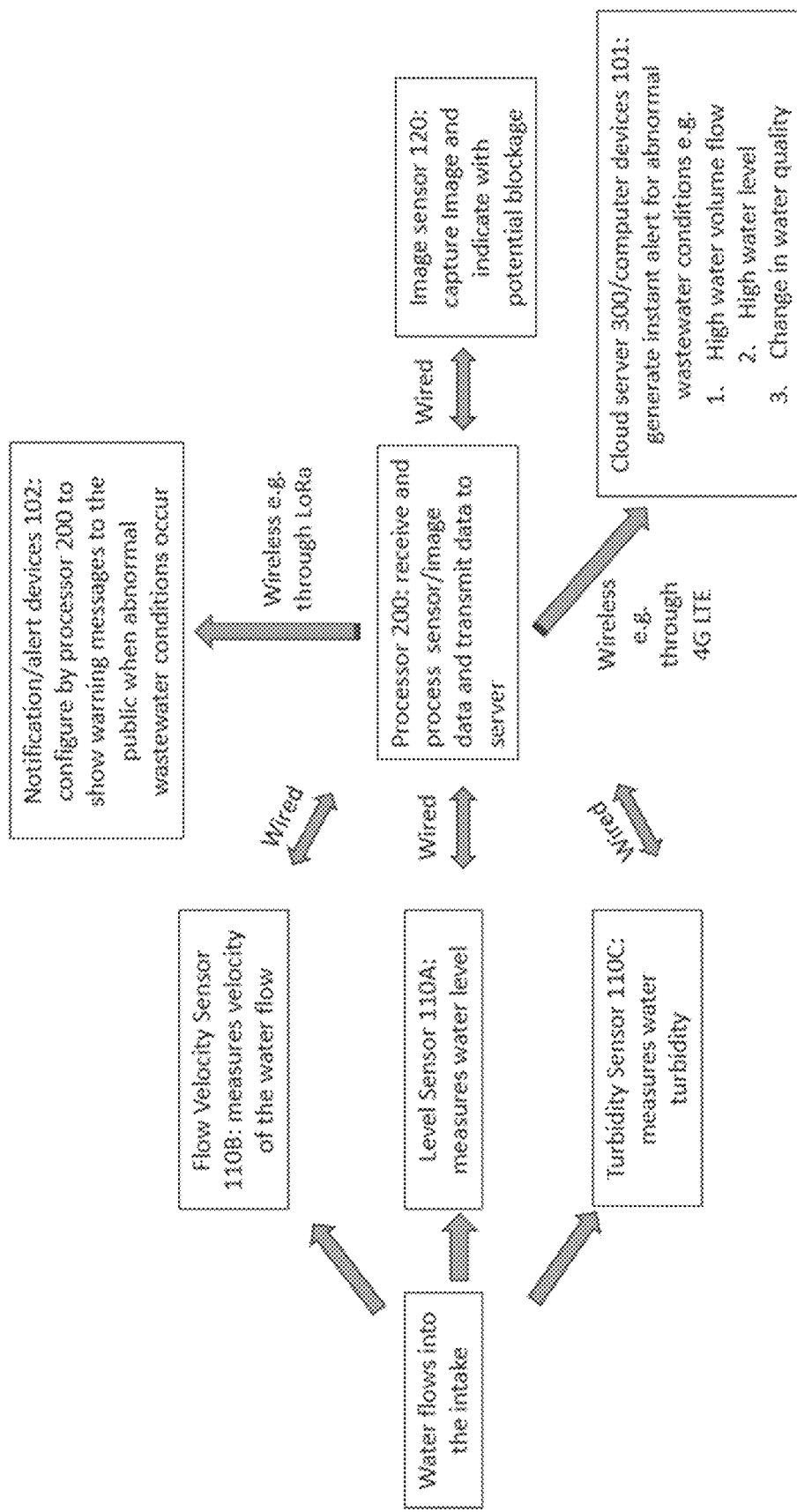
FIG. 3 is a flow diagram showing a method of monitoring a drainage network as implemented by the system of FIG. 1.
Figure 4:
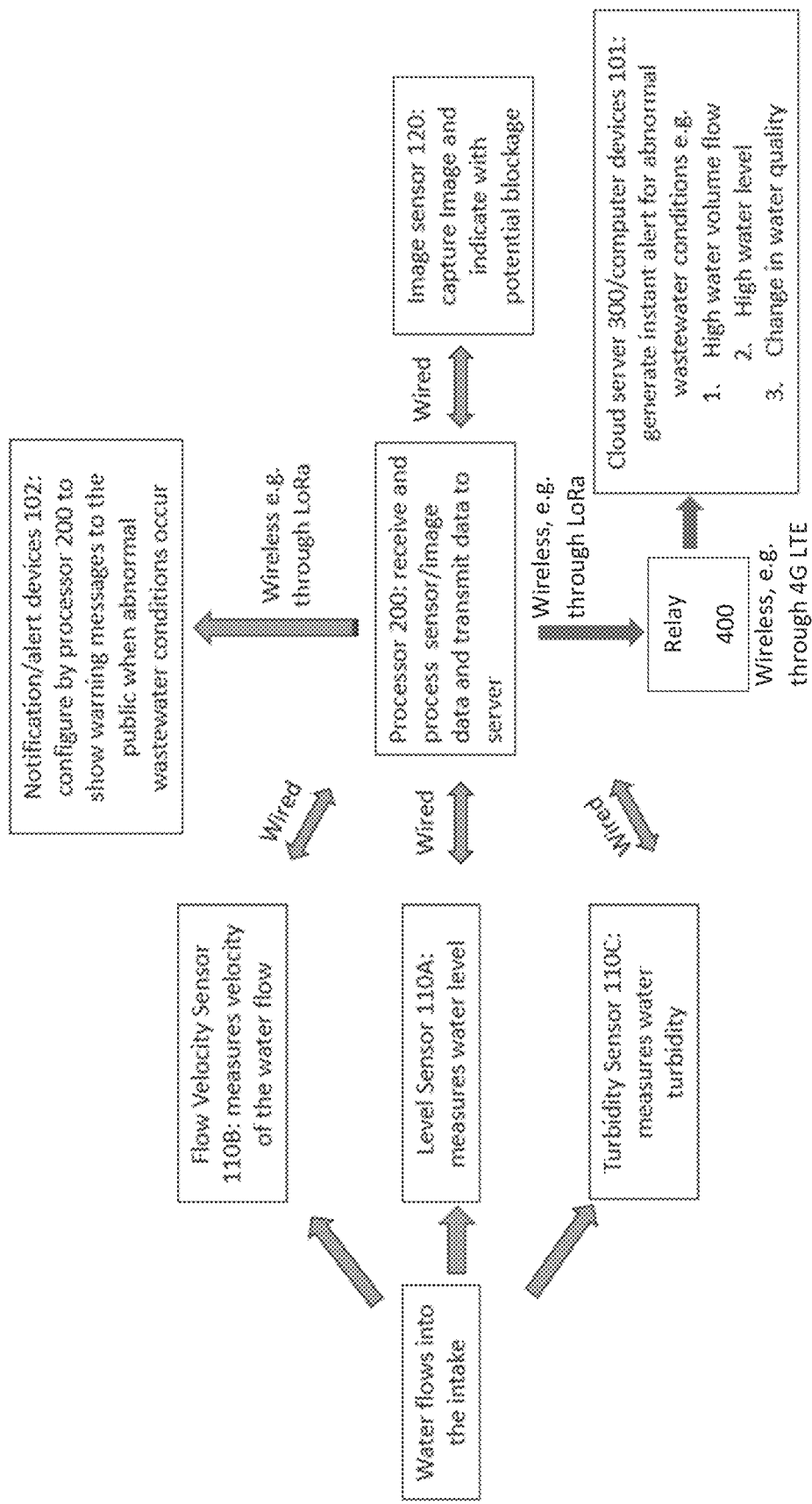
FIG. 4 is a flow diagram showing a modified method of monitoring a drainage network as implemented by a modified version of the system of FIG. 1.

Referring to FIGS. 1 and 2, illustrated are embodiments of the drainage network monitoring system 100 for wastewater such as rainwater or stormwater in accordance with the present invention. FIG. 3 further shows a method for drainage network monitoring implemented by the system 100. FIG. 4 shows a modified method for drainage network monitoring implemented by a modified version of the system 100.

As shown in the figures, the system 100 can be connected to one or more devices 101, 102 including user devices such as, but not limited to, a mobile device 101 in the form of a smart phone, a computer device 101 such as a tablet computer, a laptop computer, a personal computer (PC) or the like, although any suitable computer processing device may also be utilized. The user devices 101, 102 may also comprise any general or customized alarm systems 102, such as any form of audio alarm 102 and/or visual alert systems 102 such as an electronic notice board or display unit 102, etc. The computer devices 101 and/or the alarm systems 102 are provided for the user to receive alert signals from the system 100 if an unusual water condition and/or inadequate operating condition at the drainage network is detected. Preferably, the user devices 101 can be configured or installed with one or more specific software or applications for receiving, displaying and/or responding to the monitored results, reports or warnings.

In one embodiment, the system 100 can be configured to connect with the computer devices 101 and/or the alarm system 102 via a communications module 160, which may include a remote network such as a cloud network 300 and/or a local network such as a local server, for transmitting data. The cloud network 300 or local server may optionally comprise a cloud database 310 for storage of data received from the various functional modules of the system 100 and an analyzing module 320 for analyzing data received from the various functional modules of the system 100, which will be discussed further below.

Preferably, the communications module 160 comprises a wireless communications module 162, but may also include a wired communications module 164. The wireless communications module 162 can be implemented based on known wireless communication technologies such as but not limited to, radio frequency wireless communication executed by a radio frequency communication module 162. More preferably, the radio frequency communication module 162 comprises a low-power, wide area network (LPWAN) module 163 for executing low-bandwidth, low power wireless communication, such as the Long Range (LoRa), low frequency communications protocol. The LoRA communications protocol is advantageous in providing a relatively long operating range which may cover from a few kilometers in urban areas to over 10 km in rural settings. It allows effective data communication with low data rates and high sensitivities at low power and is applicable in low-connection locations such as indoor, underground, or rural locations, e.g., forested areas, which may not be covered by or easily connectable to other wireless communications networks. The wide area network (WAN) communication is also well optimized for low power operation, such as for battery-powered devices, which is particularly useful for areas with limited or no mains power supply such as for remote, rural areas which are common locations for drainage networks.

The radio frequency communication module 162 may further comprise a cellular communications module 165 for implementing a cellular communications protocol. Preferably, the cellular communications module 165 is adapted to implement a Fourth Generation (4G) Long-Term Evolution (LTE) communications protocol, for example. The cellular communications module 165 may further be configured to provide cellular communications of other generations such as the Fifth Generation (5G) communications protocol.

The communications module 160 may further comprise a wired communication module 164 preferably for wired connection with other local functional modules and/or networks. A person skilled in the art will appreciate that data transmission between the system 100, the user devices 101, 102 and/or any local or remote networks or server of the present invention can be provided by any known wired and/or wireless technologies not limited to the described or illustrated embodiments, as long as the variations or applications fall within the inventive concept of the present invention as defined by the appended claims.

Preferably, the system 100 may further comprise other functional blocks for performing various functions thereof. One or more of these functional blocks can be arranged aboveground and/or underground to implement their operations. For example, the system 100 may comprise one or more sensing modules 110 for detecting conditions at least at one location of the drainage network. For example, the sensing modules 110 can be arranged or installed at, inside or adjacent one or more inlets, intakes, exits, outlets and/or openings of any form of the drainage network. The sensing modules 110 may also be arranged at or within the pipes, channels, tunnels, as well as interceptors, catchment units and/or storage units of the drainage network, aboveground and/or underground. The sensing modules 110 may comprise one or more sensors such as Internet-of-Things (IoT) sensors or devices. The IoT sensors may include, for example, a water level sensor 110A for measuring water level of the wastewater; a flow velocity sensor 110B for measuring flow velocity of the wastewater; and/or a turbidity sensor 110C for measuring turbidity, e.g., cloudiness, of the wastewater, which may provide an indication of the "muddiness" of the wastewater and thus the likelihood of blockage due to accumulation of mud, silt, stones and the like.

In one embodiment, the water level sensor 110A can be used to periodically detect and monitor changes of water level at or inside the drainage network, such as at the inlets and/or outlets, to determine any unusual change of water level which differs from the typical recorded water level for a certain period of time or season such as during a low or high rainfall season. Any abnormality in the water level detected may indicate occurrence of a potential blockage or the like. The detection of a rapid rising but slow dropping of water level may also indicate a potential blockage of the drainage network.

The data collected by the sensing module 100 can be stored at a local memory 210 of the system 100 and/or at a remote, cloud database 310 for subsequent processing by the analyzing module 320. For example, the stored data can be used to facilitate artificial intelligent (AI) analytics for identifying possible flooding black spots, for providing big data for evaluating performance of specific drainage systems or regions of a drainage system, and/or for supporting continuous training of the AI system.

The system 100 may further comprise one or more imaging modules 120 such as an IoT image sensor or camera 120 for capturing images at various locations of the drainage network, aboveground and/or underground, similar to the sensing module 110 as described above. In the context of the present invention, the image captured by the imaging modules 120 can be a plurality of images, a series of images, a moving image and/or a video such as a video clip. The imaging modules 120 may capture images of objects falling or accumulating outside and/or inside a drainage tunnel which may potentially cause blockage to the drainage network. The imaging modules 120 may also comprise multiple imaging modules 120 arranged to capture images or videos at different regions of the drainage network and/or from different directions to the same region for an all-rounded capturing of conditions of the region.

In one embodiment, one or more of the sensing modules 110 and/or the imaging modules 120 can be integrated into the system 100 or may form separate functional blocks wiredly and/or wirelessly connected with other functional modules of the system 100. The system 100 may further comprise a processor 200 comprising a processing module 130 configured to process data received from one or more of the sensing modules 110 and/or the imaging modules 120, and optionally, with stored, historical data from previous detections. The previous data can be stored at a memory 210 of the system 100 and/or a database 310 located at the local server and/or the remote cloud network 300.

In one further embodiment, the local cloud network 300 may comprise an analyzing module 320 for executing computer implemented algorithms such as one or more computer visual algorithms and/or artificial intelligent (AI) machine learning algorithms for analyzing the obtained data from the sensing modules 110 and/or the imaging modules 120. Analysis by the analyzing module 320 is based on the real-time detected conditions of the wastewater and the operating conditions at specific regions of the drainage network and also the historical, previously obtained data to thereby determine potential blockage of the drainage network. For example, if it is detected that any one or more conditions of the wastewater has fallen outside of the predetermined, normal ranges set for the respective sensors, such as below a predetermined lower threshold or above a predetermined upper threshold, the relevant data will be processed by the software and the processed results will be reported in the form of alerts instantly to the user devices 101, 102 including the notification device 102. The analyzing module 320 may further identify, based on the images captured by the imaging module 120, one or more visual characteristics revealed by the images which, when processed based on the stored, previously obtained data, determines potential incidents or blockages to the drainage network. The analyzing module 320 is adapted to continue learning from the received data from the sensing module 110 and/or the imaging module 120 to increase accuracy for detections in the future. The system 100 is therefore useful in the prevention of incidents such as floodings and allows remote inspection of regions which are difficult or dangerous to physically access by service staff.

The processed results from the processor 200 will then be communicated, via the communications module 160, substantially in real-time to one or more user devices 101, 102 including the wireless notification device 102 which is preferably configured to issue and/or display notification information to users. Preferably, the user devices 101 can be configured or installed with one or more specific software or applications for receiving, displaying and/or responding to the monitored results, reports or warnings. In one embodiment, the received data from one or more of the sensing modules 110 and/or the imaging modules 120, as well as the processed data indicating or predicting conditions of the detected wastewater and the drainage will be sent to a server such as the cloud server 300 and/or a local server via wireless communication, such as through a cellular network such as a 4G LTE or 5G network. The cloud server 300 may further generate in near real-time, instant alerts to one or more computer devices 101 or smart phones 101 to report any abnormal wastewater conditions or operating conditions detected in the drainage network, for example, the detection of a high water level, a high water volume flow, and/or any change of water qualities such as the turbidity of the wastewater; or when images showing blockage or obstruction to the drainage are captured. Preferably, the reports will further be communicated, such as via a LPWAN network, and more preferably, a low frequency, long range (LoRa) communication network to one or more of the wireless notification devices 102, which can be provided in the form of an electronic warning sign or public notification board to show warning messages. The alerts may further be delivered via speakers for public announcement or announcement to a specific group of users. The communication via a LoRa network generally requires low power which is particularly useful in remote locations where the power supply is unstable or limited. Without being limited by the specific embodiment described and illustrated, a person skilled in the art will appreciate that other wireless communication technologies such as other type of radio frequency based wireless communication technologies, shall also be applicable.

In one embodiment, the system 100 may comprise one or more standalone power modules 170 for locally powering the system 100 and the one or more functional modules of the system 100. For example, the power module 170 may comprise one or more of a solar power module, a wind power module and/or a hydroelectric power module. In one further embodiment, the user devices such as the wireless notification device 102 or the alert device 102 can also be powered by dedicated, local standalone power supplies such as solar power. By standalone power supply is meant a power supply not connected to a main power supply, but an isolated power supply dedicated to a single device or closely connected set of devices such as those comprising the system 100 of FIG. 1.

A person skilled in the art will appreciate that the present invention should not be limited to the specific embodiments as described and illustrated. For example, the skilled person will understand that the sensing module 110, the imaging module 120, as well as the other functional modules of the present invention may comprise other internet-of-things devices or other devices, as long as the devices operate to perform the functions as claimed for the respective modules.

In one aspect of the present invention, the system 100 is configured as a device to comprise the memory 210 for storing data and the processor 200 for executing computer readable instruction. The processor 200 is configured by the computer readable instructions, when being executed, to implement the method and the system as above described. The memory 210 storing machine-readable instructions and the processor 200 for executing said machine-readable instructions together embody the system 100. It will be understood that the system 100 may comprise a plurality of components connected to the local server and/or cloud network 300 for implementing the methods of the invention. It will also be understood that the system 100 can be embodied in any suitable computer devices by downloading suitable software to said computer devices. Although the sensing module 110, the imaging module 120, the communicating module 160, the power module 170 and/or the processor 200 comprising the processing module 130 are shown as being deployed as functional components of the system 100, there is no limitation to such a deployment configuration according to the concepts of the invention. For example, one or more of these modules may be deployed as respective functional blocks that is distinct from, but connected to, the system 100. One or more of the modules can be separately implemented using logic circuits and/or executable code/machine readable instructions stored in a memory 210 of the system 100 for execution by a processor 200 to thereby perform functions as described herein. For example, the executable code/machine readable instructions may be stored in one or more memories 210, e.g., random access memory (RAM), read only memory (ROM), flash memory, magnetic memory, optical memory or the like, suitable for storing one or more instruction sets, e.g., application software, firmware, operating system, applets, and/or the like, data, e.g., configuration parameters, operating parameters and/or thresholds, collected data, processed data, and/or the like, etc. The memory 210 may comprise processor-readable memories for use with respect to one or more processors 200 operable to execute code segments of any one or more of the functional modules as described above, and/or to utilize data provided thereby to perform functions of the system 100 as described herein. Additionally, or alternatively, one or more of the modules described may comprise one or more special purpose processors, e.g., application specific integrated circuit (ASIC), field programmable gate array (FPGA), graphics processing unit (GPU), and/or the like configured to perform functions of the system 100 as described herein.

In yet another aspect of the present invention, it is provided a non-transitory computer readable medium storing machine-readable instructions which, when implemented on a processor, implements the steps of the method as above described.

FIG. 4 differs from FIG. 3 in that the wireless communications connection between the communications module 160 and the cloud server 300/other devices 101, for example, includes a relay device 400 for at least amplifying a low power, LoRa wireless communications signal conveying processed data from the system 100 to the cloud server 300/other devices 101. The relay device is preferably located where it can be connected to a main power supply in contrast to the system 100 which is typically located remote from main power supply connections. The relay device 400 is preferable also configured to convert the LoRa wireless communications signal conveying processed data to the cellular wireless communications protocol signal or even to a wired communications protocol signal to communicate the processed data to the cloud server 300/other devices 101. The relay 400 thereby greatly extends the range of the system 100 to connect to a Cloud system 300 or other such network.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A rainwater drainage network monitoring system, comprising:
   a sensing module for detecting a blockage at a location in the rainwater drainage network;
   a processing module for processing data received from the sensing module; and
   a wireless communications module for communicating the processed data in real-time to one or more wireless devices including a wireless notification device and to a remote cloud network configured to issue notification information to users;
   wherein the wireless communications module utilizes a narrow bandwidth, low power wireless communications protocol to communicate processed data to the wireless notification device and to the remote cloud network, and wherein the rainwater drainage network monitoring system has no mains power supply but has a standalone power supply whereby all of the modules of the system are powered by the standalone power supply.

2. The rainwater drainage network monitoring system of claim 1, wherein the standalone power supply comprises a renewable energy power supply, and the narrow bandwidth, low power wireless communication protocol comprises the Long Range (LoRa) wireless communications protocol.

3. The rainwater drainage network monitoring system according to claim 2, wherein the renewable energy power supply comprises one or more of a solar power module, a wind power module, and/or a hydroelectric power module.

4. The rainwater drainage network monitoring system of claim 1, wherein the wireless communications module connects the sensing module wirelessly to a communications network using a cellular wireless communications protocol.

5. The rainwater drainage network monitoring system of claim 4, wherein the wireless communications module connects the sensing module wirelessly to the communications network via a remote relay device, wherein communication of processed data from the wireless communications module to the relay device is via the narrow bandwidth, low power wireless communications protocol and wherein the relay device converts the processed data from the narrow bandwidth, low power wireless communications protocol to the cellular wireless communications protocol for communicating the processed data from the relay device to the communications network.

6. The rainwater drainage network monitoring system according to claim 1, wherein the sensing module comprises one or more of a level sensor, a flow velocity sensor, a turbidity sensor, and/or a camera.

7. The rainwater drainage network monitoring system according to claim 1, wherein the wireless communications module comprises a low-power, wide area network (LP-WAN) module.

8. The rainwater drainage network monitoring system according to claim 4, wherein the wireless communications module comprises a long-term evolution (LTE) communications module.

9. The rainwater drainage network monitoring system according to claim 1, wherein the processing module is configured to execute a computer implemented algorithm comprising one or more computer visual algorithms and/or artificial intelligent (AI) machine learning algorithms.

10. A method of monitoring a rainwater drainage network, comprising the steps of:
    detecting, via a sensing module of a rainwater drainage network monitoring system, a blockage at a location in the rainwater drainage network;
    processing, via a processing module of the rainwater drainage network monitoring system, data received from the sensing module;
    communicating, via a wireless communications module of the rainwater drainage network monitoring system, the processed data in real-time to one or more wireless devices including a wireless notification device and to a remote cloud network configured to issue notification information to users;
    wherein the wireless communications module utilizes a narrow bandwidth, low power wireless communications protocol to communicate processed data to the wireless notification device and to the remote cloud network, and wherein the rainwater drainage network monitoring system has no mains power supply but has a standalone power supply whereby all of the modules of the system are powered by the standalone power supply.

11. The method according to claim 10, wherein the detecting step comprises detecting one or more of a level, a flow velocity and/or a turbidity of water at the location in the rainwater drainage network by one or more of a level sensor, a flow velocity sensor and/or a turbidity sensor, respectively.

12. A rainwater drainage network monitoring device, comprising a memory for storing data and a processor for executing non-volatile computer readable instructions, wherein the processor is configured by the non-volatile computer readable instructions when being executed to implement the method of claim 10.

* * * * *